(12) United States Patent
Kaelin et al.

(10) Patent No.: US 6,435,682 B1
(45) Date of Patent: Aug. 20, 2002

(54) LASER IMAGING USING A SPATIAL LIGHT MODULATOR

(75) Inventors: Barney J. Kaelin, Playa del Rey; Stephen J. Reinsch, Escondido, both of CA (US)

(73) Assignee: Victor Company of Japan, Limited (JP)

(*) Notice: Subject to any disclaimer, the term of this patent is extended or adjusted under 35 U.S.C. 154(b) by 0 days.

(21) Appl. No.: 09/568,965

(22) Filed: May 11, 2000

Related U.S. Application Data

(63) Continuation of application No. 09/251,643, filed on Feb. 17, 1999, now Pat. No. 6,079,833.

(51) Int. Cl.[7] ................ G03B 21/00; G03B 21/26; G02F 1/135; G02F 1/1335; G09G 1/10
(52) U.S. Cl. ............... 353/31; 353/33; 353/34; 353/37; 353/122; 349/25; 349/61; 345/16; 345/32; 345/135
(58) Field of Search ............... 353/31, 33, 34, 353/37, 122; 349/25, 61; 345/32, 135, 16

(56) References Cited

U.S. PATENT DOCUMENTS

| | | | |
|---|---|---|---|
| 4,343,535 A | 8/1982 | Bleha, Jr. | |
| 4,650,286 A | 3/1987 | Koda et al. | |
| 5,398,082 A | * 3/1995 | Henderson et al. | ........... 353/31 |
| 5,428,467 A | 6/1995 | Schmidt | |
| 5,465,174 A | 11/1995 | Sprotbery | |
| 5,521,748 A | 5/1996 | Sarraf | |
| 5,700,076 A | 12/1997 | Minich et al. | |
| 5,704,700 A | * 1/1998 | Kappel et al. | ........... 353/31 |
| 5,847,400 A | 12/1998 | Kain et al. | ........... 356/445 |

* cited by examiner

Primary Examiner—Russell Adams
Assistant Examiner—Khaled Brown
(74) Attorney, Agent, or Firm—Harness, Dickey & Pierce, P.L.C.

(57) ABSTRACT

An image projection system is provided for generating an energy efficient output representative of a desired input image. The image projection system includes a light source positioning device for directing the light from a light source onto a spatial light modulator. An image source provides the desired image to the spatial light modulator and also image information to a light source position controller for coordinating the light source positioning device, such that the light from the light source impinges substantially only the area of the spatial light modulator which contains the desired image. In particular, the controller actuates the light source positioning device by using a predefined scan that corresponds to the desired image. The spatial light modulator modulates the light with the desired input image and generates an output representative of the desired image. A beam brush may also be used for changing the width of the projection beam from light source, thereby improving image resolution and maximizing energy conservation.

13 Claims, 7 Drawing Sheets

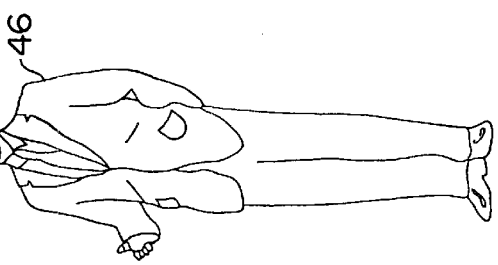
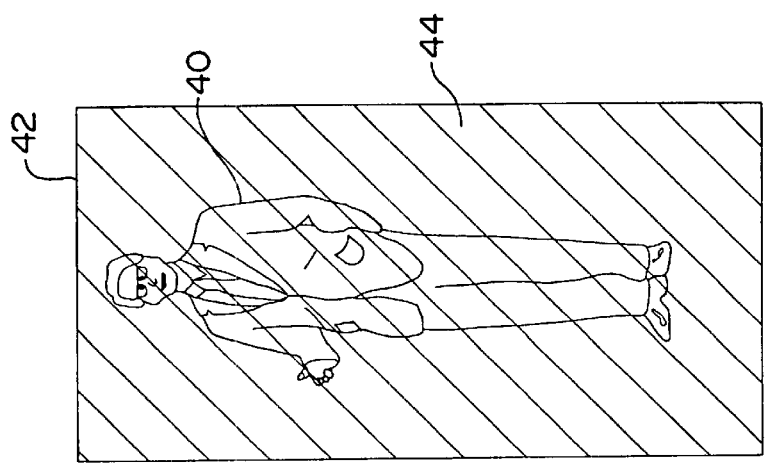
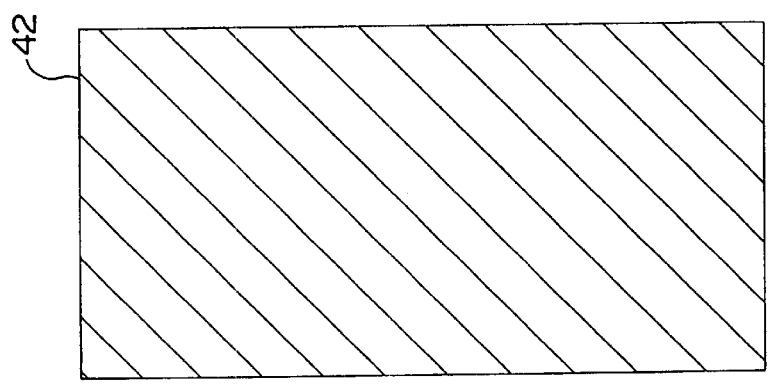
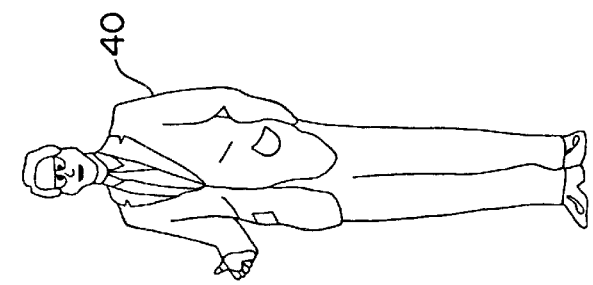

FIG 6A
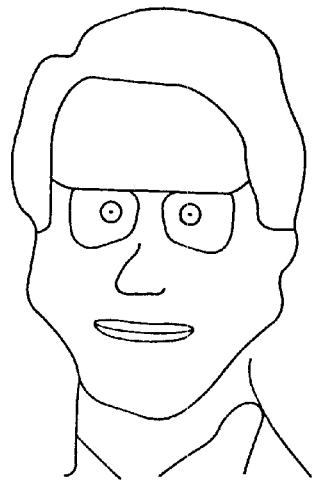
FIG 6B
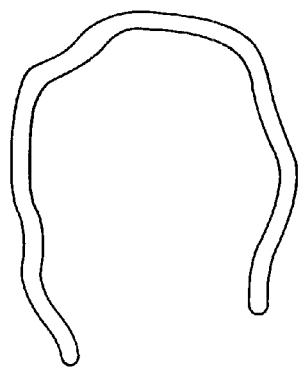
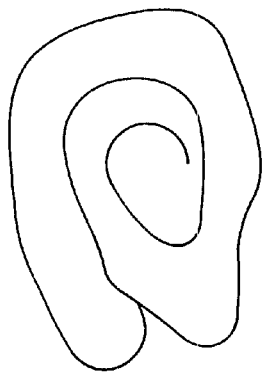
FIG 6C
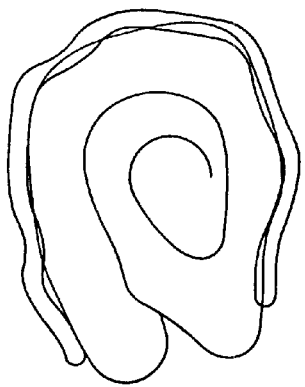
FIG 6D

FIG 7A
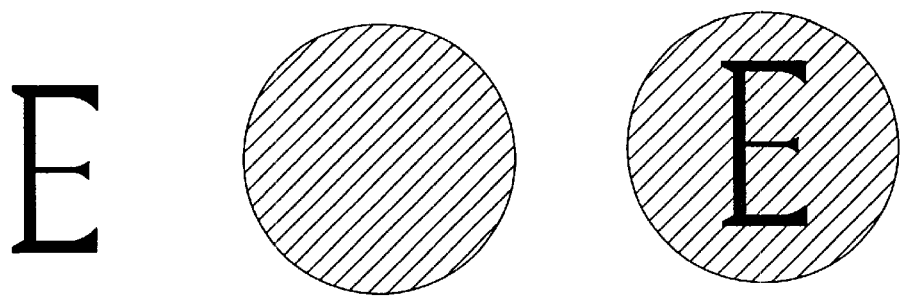
FIG 7B
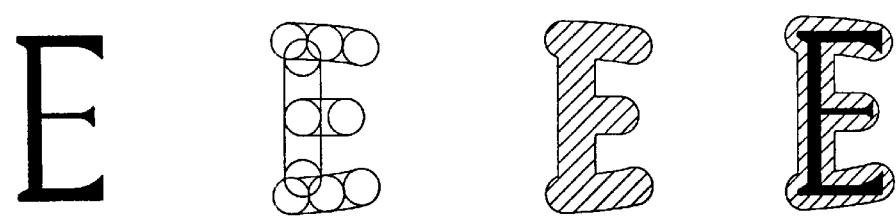
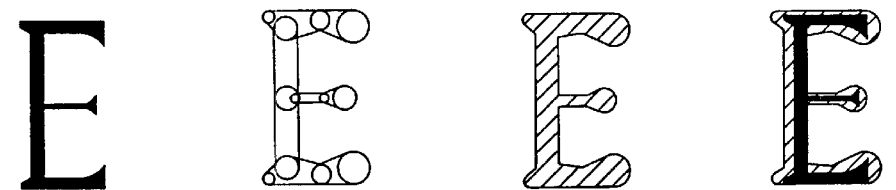
FIG 7C

LASER IMAGING USING A SPATIAL LIGHT MODULATOR

This is a continuation of U.S. patent application Ser. No. 09/251,643 filed Feb. 17, 1999.

BACKGROUND OF THE INVENTION

1. Technical Field

This invention relates to an image projection system and, more particularly, to an image projection system that generates an energy efficient image by selectively directing projection light onto a spatial light modulator.

2. Discussion of Related Art

Image projection system for projecting images onto a remote viewing area are generally known. Early versions of these image projection systems utilized relatively low intensity light sources for providing a projection light which is in turn used to project an image formed on its spatial light modulator to a distance viewing area. The resulting image displayed in the viewing area was large enough to be viewed by a group gathered within a relatively dark viewing area. However, the displayed image was often washed out by ambient light in brighter viewing environments, thereby limiting the usefulness of these image projection systems.

To overcome the problems associated with bright viewing environments, high intensity light sources were used in the image projection systems to generate the necessary projection light for displaying an image. While these image projection systems produced a displayed image which could be seen in bright ambient light conditions, the use of these light sources remained somewhat inefficient and costly. In these conventional image projection systems, a spatial light modulator was entirely flooded by its light source (typically an arc lamp) and then modulated with the desired image. The spatial light modulator, working with the polarizers normally found in such systems, effectively blocks the light from the light source in non-image areas while passing light in the desired image areas. Thus, these image projection systems inefficiently used the projection light from its light source since much of its energy does not produce the resultant displayed image. Therefore, it is desirable to provide a high resolution and energy efficient image projection system.

SUMMARY OF THE INVENTION

In accordance with the teachings of the preferred embodiment, an image projection system is provided for generating an energy efficient output representative of a desired input image. The image projection system includes a light source positioning device for directing the light from a light source onto a spatial light modulator. An image source provides the desired image to the spatial light modulator and also image information to a light source position controller for coordinating the light source positioning device, such that the light from the light source impinges substantially only the area of the spatial light modulator which contains the desired image.

The image projection system of the present invention better utilizes its light source by directing light only to the area on the spatial light modulator which contains the desired image. Using narrow angle light sources, such as lasers, helps to give a tremendous depth of field when compared to a normal arc lamp. In addition, the present invention reduces laser speckles as well as eliminates off state leakage by the spatial light modulator.

BRIEF DESCRIPTION OF THE DRAWINGS

Other objects and advantages of the present invention will be apparent to those skilled in the art upon reading the following detailed description and upon reference to the drawings in which:

FIGS. 2A–2D illustrate how a conventional image projection system generates an output representative of the desired input image;

FIGS. 6A–6D illustrate how a beam brush may be used to generate a scan for use by the image projection system of the present invention; and FIGS. 7A–7C contrast the energy efficiency of the image projection system of the present invention with a conventional image projection system.

DETAILED DESCRIPTION OF THE PREFERRED EMBODIMENT

While the invention is described herein with reference to illustrative embodiments for particular applications, it should be understood that the invention is not limited thereto. Those having ordinary skill in the art and access to the teachings provided herein will recognize additional modifications, applications and embodiments within the scope thereof and additional fields in which the present invention would be of significant utility.

Figure 1:
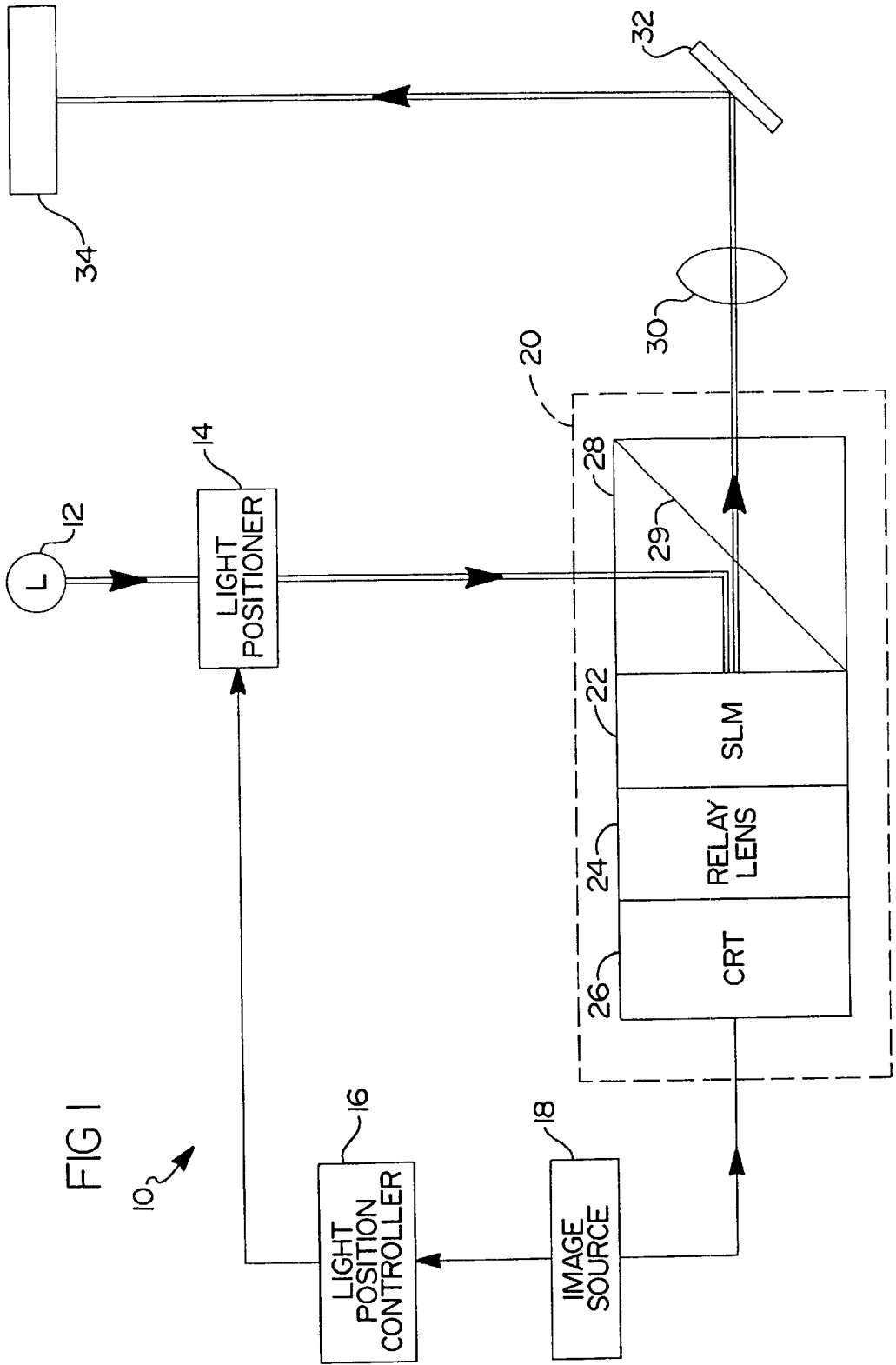
FIG. 1 is a block diagram showing an image projection system of the preferred embodiment of the present invention.

An image projection system 10 for generating an energy efficient image is depicted in FIG. 1. Image projection system 10 includes a light source 12, a light source positioning device 14, a light source position controller 16, an image source 18 and a spatial light modulator system 20. Light source positioning device 14 directs the light from light source 12 to spatial light modulator system 20. Image source 18 provides the desired image to system 20 and simultaneously provides image information to controller 16 for coordinating light source positioning device 14, such that the light from light source 12 impinges substantially only the area of spatial light modulator system 20 which contains the desired image.

Light source 12 (preferably a laser) is used to produce a narrow, intense input beam for impinging on spatial light modulator system 20. It is also envisioned that other light sources (e.g., Xenon arc lamp) may be used in the present invention. In the latter case, various optics may be used to shape or focus the light which impinges on spatial light modulator system 20. Light source positioning device 14 is positioned in the path of light source 12 for directing its projection beam onto spatial light modulator system 20. Light source positioning device 14 is preferably at least two G Series Open Loop galvanometers or an acusto-optic scanner.

Image source 18 (e.g., a VCR or laser disk player) provides image information about the desired input image to controller 16 and spatial light modulator system 20. Light source position controller (or image processor) 16 may be a digital signal processor or a general purpose computer which can be used to actuate light source positioning device 14 in relation to the desired image on spatial light modulator system 20. Spatial light modulator system 20 then modulates the projection light with the desired image, thereby generating an output representative of the desired image.

Spatial light modulator system 20 is generally comprised of a spatial light modulator 22, a relay lens 24, and a cathode ray tube (CRT) 26. The desired image is supplied to spatial light modulator system 20 by image source 18 which is connected to CRT 26. The image generated by CRT 26 is in turn transferred by relay lens 24 to spatial light modulator 22. Spatial light modulator 22 is preferably a reflective photoelectric light valve, such as the Model M30h Image Light Amplifier liquid crystal light valve manufactured by Hughes-JVC Technology Corporation of Carlsbad, Calif. Various other types of spatial light modulators fall within the scope of the present invention, including other reflective or transmissive spatial light modulators. The projection light from light source 12 acts as a reading light for spatial light modulator 22, whereas a writing light forming the desired image on spatial light modulator 22 is provided by CRT 26. Spatial light modulator system 20 further includes a polarizing beam splitter 28 having a polarizing reflective surface 29 for polarizing and redirecting the projection light from source 12 onto spatial light modulator 22. As will be apparent to one skilled in the art, other configurations for the spatial light modulator system 20 may be employed within the scope of the present invention.

An output image from spatial light modulator system 20 can be viewed in focus at great distance (e.g., easily 200 feet or more). A projection lens subsystem 30 is optionally disposed in the path of the output image for projecting the image to a remote viewing area 34. To direct the output image to different viewing areas, an actuable mirror and other reflective surfaces 32 can also be positioned in the path of the output image.

FIGS. 2A–2D illustrate the operation of a conventional image projection system. A CRT provides a writing light image, such as the man 40 shown in FIG. 2A, onto a spatial light modulator. To project this image, light is flooded entirely onto one side of the spatial light modulator 42 as seen in FIG. 2B. FIG. 2C illustrates how the light impinges on the entire surface area of the spatial light modulator, including the area 44 which does not contain the desired image. Referring to FIG. 2D, a projected image 46 representative of the man is the output from the spatial light modulator. As can be seen, the energy of the light source in area 44 is blocked by the spatial light modulator and thus is not used to generate the resultant image 46. Image projection systems of this type are described in several U.S. patents, including U.S. Pat. No. 4,650,286 to Koda for Liquid Crystal Light Valve Color Projectors and U.S. Pat. No. 4,343,535 to Bleha, Jr. for Liquid Crystal Light Valve, which are incorporated herein by reference.

Figure 3D:
FIGS. 3A–3D illustrate how the image projection system of the present invention generates an energy efficient output representative of the desired input image.
Figure 3C:
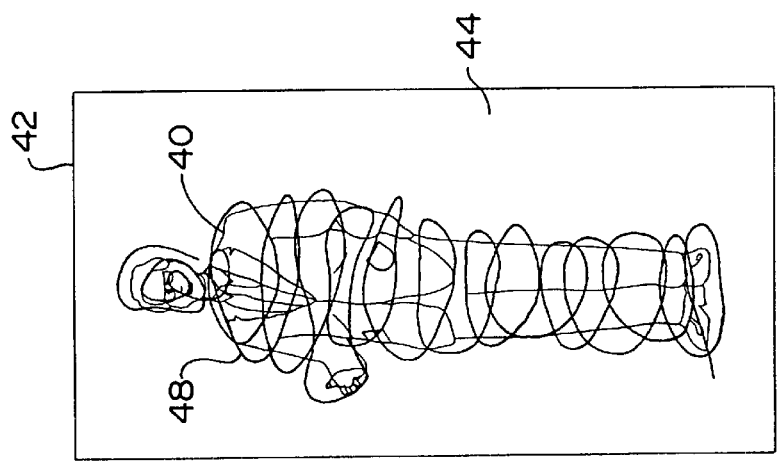
Figure 3B:
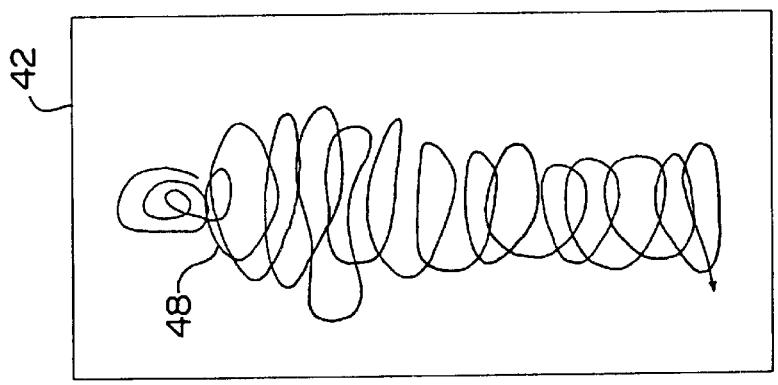
Figure 3A:
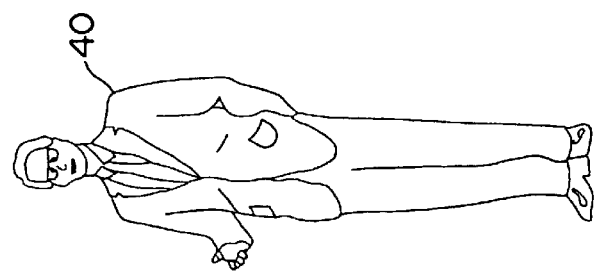

Although similar in operation to these conventional image projection systems, image projection system 10 of the present invention better utilizes its light source by directing light only to the area on the spatial light modulator which contains the desired image, such as image 40 of FIG. 3A. By using light source positioning device 14, light from light source 12 is directed towards spatial light modulator system 20, such that light impinges substantially only on the area of the spatial light modulator 22 associated with the desired image. For instance, laser light from source 12 is scanned onto the spatial light modulator 22 only onto the subarea 48 which substantially correlates to the image area of the man provided by the CRT 26. In that case, controller 16 coordinates light source positioning device 14 to produce the path for the projection light as shown in FIG. 3B at subarea 48.

Generally, this path does not precisely follow the CRT scan, however a beat pattern may form if scanning is performed too far out of phase or at an incorrect relative speed. Referring to FIG. 3C, light impinges substantially only on the subarea 48 of the spatial light modulator 22 which is modulated to form the image of the man 40 and not in non-image area 44. Spatial light modulator 22 is also modulated by image source 18 to further trim the output image. FIG. 3D shows a more defined and energy efficient output image 46' as produced by image projection system 10 of the present invention.

For a simple still image, an approximate path for the projection light can be manually created and stored using controller 16. It is envisioned that for these types of images, spatial light modulator 22 may be replaced with a reflective or transmission slide of the desired image. However, for more complex images and/or video input signals, image/laser coordination is typically performed using techniques common in the area of animation. When a video signal is used to drive spatial light modulator 22, then the path must fill the image from top to bottom to approximately follow the on state area of spatial light modulator 22 as it scans down the video picture.

Figure 4:
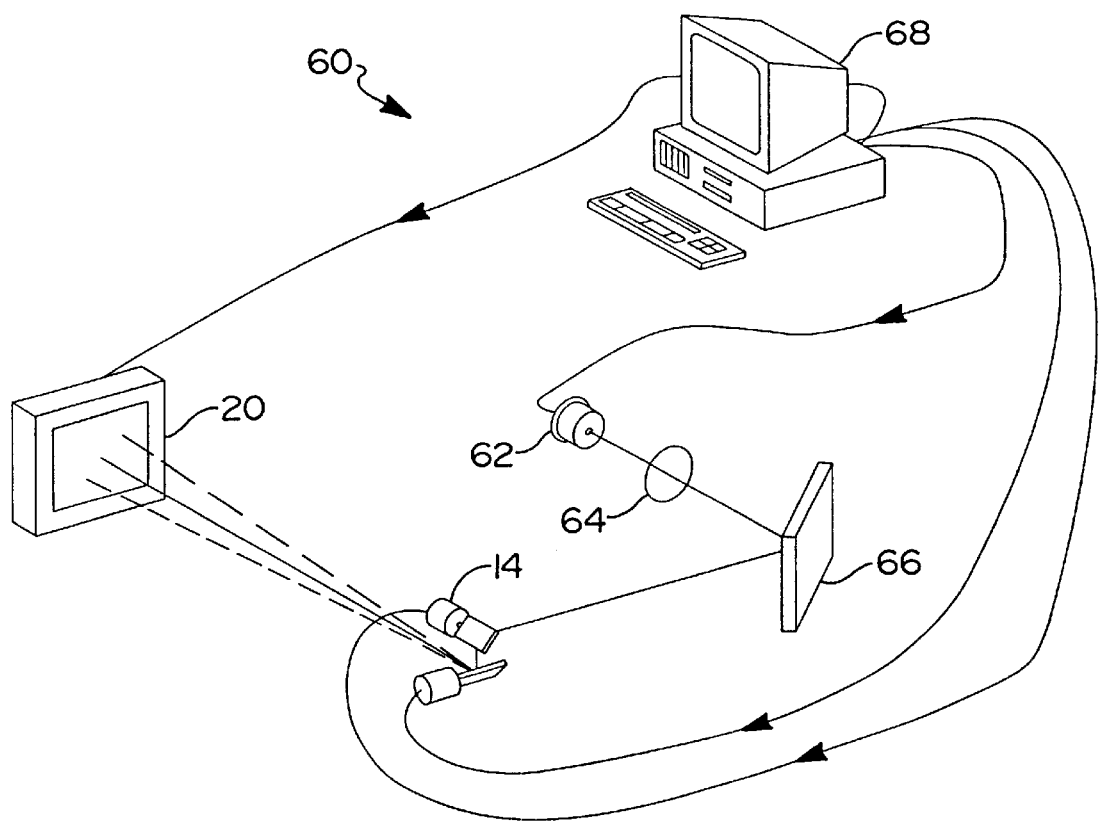
FIG. 4 is a diagram showing a first embodiment of the image projection system of the present invention.

In accordance with the present invention, a first embodiment of an image projection system 60 is depicted in FIG. 4. In this particular configuration, a 15 milliwatt red laser diode is used for light source 62 with a lens 64 optionally positioned in the path of the diode for focusing it onto light source positioning device 14. A mirror 66 or other reflective optics may be used to direct the projection beam towards light source positioning device 14. In this embodiment, a general purpose computer 68 serves as both controller 16 and image source 18 of FIG. 1. Thus, computer 68 can provide image information to spatial light modulator system 20 while coordinating the input to light source positioning device 14.

Figure 5:
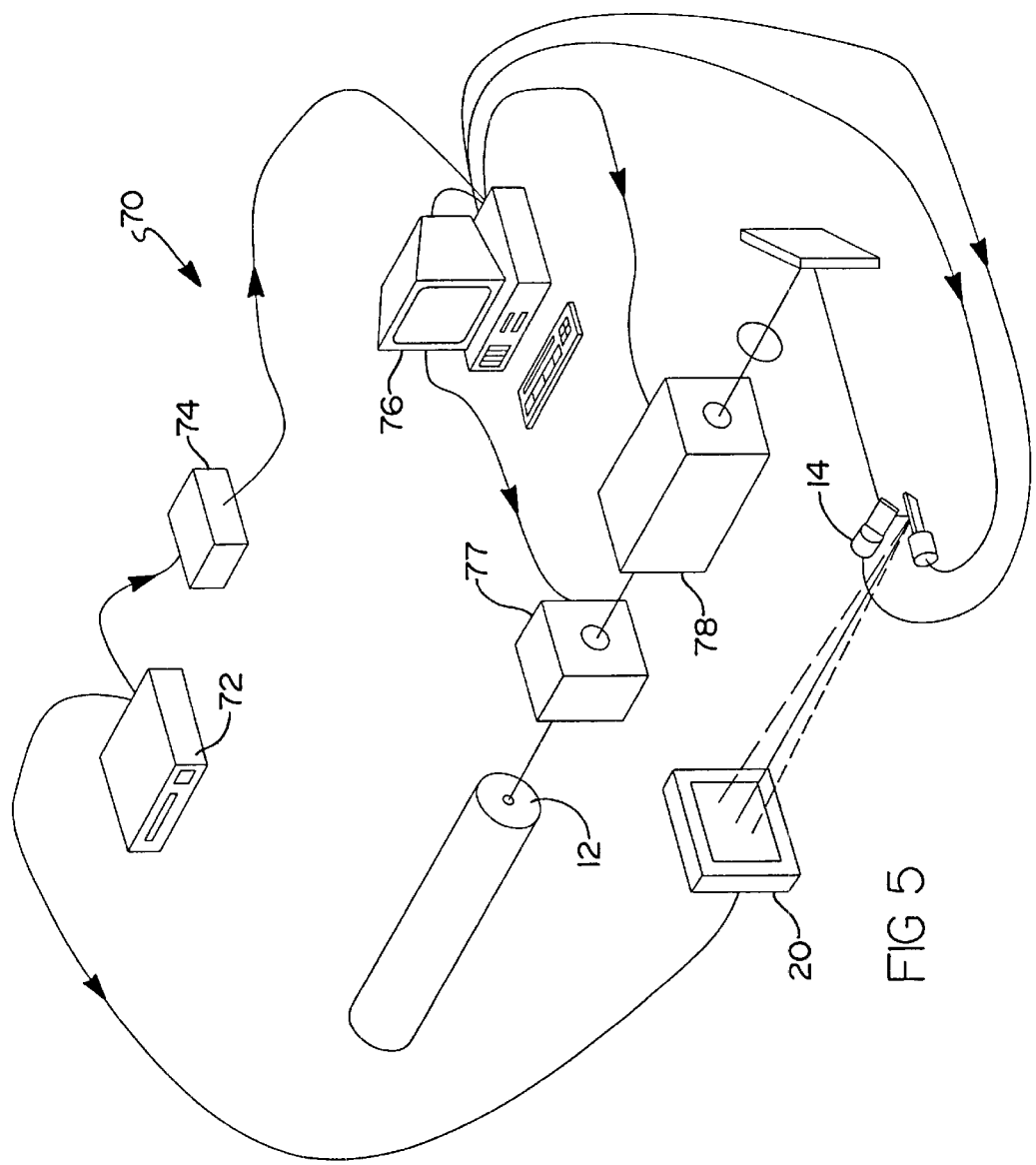
FIG. 5 is a diagram showing a second embodiment of the image projection system of the present invention.

A second embodiment of an image projection system 70 is shown in FIG. 5. Spatial light modulator 20 is modulated with a video signal from an image source 72 (e.g., a laser disk player) which in turn is connected via a time code box 74 to general computer 76. General purpose computer 76 acts as the light source position controller for the system, and thus receives references (i.e., time codes) from time code box 74 for performing proper image/laser coordination. For instance, a reference code may indicate an upcoming movement in the desired image (e.g., a man begins waving his hand) and in response the computer 76 will use a scan that corresponds to the desired image of the man waving his hand to coordinate the light source positioning device 14.

A laser intensity modulator 77 and/or beam brush 78 may optionally be positioned in the projection path of light source 12. Laser intensity modulator 74 can be used to prevent off state leakage in the output image by shutting off light as the projection beam moves across a portion of spatial light modulator 22 that has no image. As shown, laser intensity modulator 77 can be controlled by the general computer 76. For simple image applications where a laser diode light source can be quickly switched off and on, laser intensity modulator 77 may not be needed. Beam brush 78 may also be used to change the shape of the projection beam from light source 12. Although a beam brush 78 may also not be needed for a simple course image, it can be used to provide greater detailed output images and/or to maximize energy conservation of light source 12.

FIGS. 6A–6D illustrate how beam brush 78 may be used by image projection system 70. FIG. 6A shows the face of a man as being the desired image on spatial light modulator system 20. A small diameter beam is used in FIG. 6B to outline the desired image. In FIG. 6C, a larger diameter beam can then be used to more quickly and accurately fill in the outline of the image. The resulting path for the scan, as shown in FIG. 6D, corresponds to the desired image of the man's face. It should be noted that the intensity (per area) of the light source changes when the beam size is changed by beam brush 78. Accordingly, the brightness of the beam increases when the beam diameter is small and decreases when the beam diameter is large. As will be apparent to one skilled in the art, the beam scan speed can be increased when the beam diameter is small and decreased when the beam diameter is large to make the intensity of the output image appear to be constant. It is also envisioned that the beam brush 78 may use a beam shape other than round (i.e., a sharp or feathered edge beam) when scanning the image.

Lastly, the energy efficiency of each of the above described embodiments are contrasted with a conventional image projection system in FIGS. 7A–7C. In each of these Figures the character "E" is the desired image being placed on the system's spatial light modulator. As shown in FIG. 7A, the spatial light modulator of a conventional system is flooded by the light from its light source. As a result, more than 95% of the projected light is wasted on the non-image areas of the spatial light modulator. In contrast, an image projection system 10 of the present invention only directs the projection beam to the area where the image is located on its spatial light modulator. The approximate beam path in relation to the desired character is shown in FIG. 7B. By only slightly "over scanning" the image area on the spatial light modulator, an image projection system 10 of the present invention (without a beam brush) significantly reduces the amount of wasted light from its light source. Moreover, FIG. 7C illustrates that by incorporating a beam brush, such as beam brush 78, to vary the size of the beam, an alternative embodiment of the present invention is able to further minimize the amount of wasted light from its light source.

The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

What is claimed is:

1. An image projection system comprising:
   a spatial light modulator having an image surface of a given area;
   an image source for generating signals defining a desired image having an active image area less than the area of the image surface of the spatial light modulator;
   a reading light source for providing a reading light for the spatial light modulator;
   a writing light source for forming the desired image on the spatial light modulator; and
   means for coupling said signals from the image source to the reading light source as well as to the writing light source, and
   said signals controlling the reading light source so that it selectively illuminates substantially only the image area on the spatial light modulator thereby optimizing the energy from the light source to project the image.

2. The image projection system of claim 1 wherein the writing light source is a cathode ray tube (CRT) and wherein the reading light source is a laser beam.

3. The projection system of claim 2 wherein the reading light source comprises:
   a laser beam source; and
   a light positioner for scanning the laser beam onto the image area on the spatial light modulator.

4. The projection system of claim 3 wherein the CRT illuminates one surface of the spatial light modulator and wherein the laser beam illuminates an opposite surface of the spatial light modulator.

5. The projection system of claim 4 wherein the spatial light modulator is a light valve.

6. An image projection system comprising:
   a laser light source for generating a projection beam;
   a spatial light modulator system for generating an output image, said system including a light valve having an image surface of a given area and a cathode ray tube for writing image information onto the light valve;
   an image source providing signals to the cathode ray tube for writing image information onto the light valve; and
   said laser light source using said image information to scan the projection beam substantially only on those areas of the light valve containing image information thereby utilizing substantially all of the energy from the light source to project the image.

7. An image projection system comprising:
   a light source;
   a spatial light modulator having a surface with a given surface area, substantially the entire surface are of the spatial light modulator being available for modulation;
   a light source positioning device for directing light from the light source onto the surface of said spatial light modulator;
   a controller for controlling the light source positioning device;
   an image source providing image information about a desired image to be projected, said desired image covering a subarea of the surface of the spatial light modulator; and
   said image information being used by the controller to direct the light from the light source substantially only onto the subarea of the spatial light modulator containing the desired image to form a projected image;
   whereby substantially all of the energy from the light source is used to form the projected image.

8. The system of claim 7 wherein the light source is a laser producing a beam that is scanned onto the subarea of the spatial light modulator.

9. The system of claim 8 wherein said image source comprises a video source of video image information.

10. The system of claim 9 wherein the video source is a video cassette recorder (VCR) or a laser disc player.

11. The system of claim 7 which further comprises a cathode ray tube (CRT) for generating a writing light to stimulate the spatial light modulator.

12. The system of claim 7 wherein the light source positioning device comprises galvanometers or acoustic-optical scanners.

13. A method of using a spatial light modulator to project an image, the spatial light modulator having an active surface area capable of modulating light, with the image desired to be projected being smaller than the active surface area of the spatial light modulator, said method comprising:

providing an image source providing electrical signal representations of the image desired to be projected;

using said electrical signals to stimulate a subarea of the spatial light modulator that correlates to the desired image to be projected; and illuminating substantially exclusively said subarea with a laser beam whereby essentially all of the energy from the laser beam is used to project the image.

* * * * *